(12) United States Patent
Hinds et al.

(10) Patent No.: US 8,928,936 B2
(45) Date of Patent: Jan. 6, 2015

(54) RED-GREEN-BLUE TO MONOCHROME COLOR CONVERSION

(75) Inventors: Arianne Therese Hinds, Louisville, CO (US); Nenad Rijavec, Longmont, CO (US); Natalie Dawn Ross, Longmont, CO (US)

(73) Assignee: Ricoh Production Print Solutions LLC, Boulder, CO (US)

( * ) Notice: Subject to any disclaimer, the term of this patent is extended or adjusted under 35 U.S.C. 154(b) by 1365 days.

(21) Appl. No.: 12/643,110

(22) Filed: Dec. 21, 2009

(65) Prior Publication Data

US 2011/0149308 A1 Jun. 23, 2011

(51) Int. Cl.
*G06T 5/00* (2006.01)
*G06K 15/00* (2006.01)
*G06K 9/00* (2006.01)
*G06K 9/60* (2006.01)
*H04N 1/40* (2006.01)

(52) U.S. Cl.
CPC ..... *H04N 1/40012* (2013.01); *Y10S 707/99936* (2013.01)
USPC .......... 358/1.9; 358/3.26; 358/3.08; 382/167; 382/181; 382/305; 359/619; 707/999.006

(58) Field of Classification Search
USPC .................. 358/1.9, 3.26, 3.08; 382/305, 181
See application file for complete search history.

(56) References Cited

U.S. PATENT DOCUMENTS

| | | | | |
|---|---|---|---|---|
| 2004/0218838 | A1* | 11/2004 | Tojo et al. | 382/305 |
| 2005/0157319 | A1 | 7/2005 | Mizuhashi et al. | |
| 2005/0280869 | A1* | 12/2005 | Kameyama | 358/3.01 |
| 2006/0227382 | A1* | 10/2006 | Ng et al. | 358/3.26 |
| 2006/0274386 | A1 | 12/2006 | Wakazono et al. | |
| 2007/0080975 | A1 | 4/2007 | Yamashita et al. | |
| 2008/0218508 | A1 | 9/2008 | Pearman et al. | |
| 2009/0015541 | A1 | 1/2009 | Honbo | |
| 2009/0079681 | A1 | 3/2009 | Chang et al. | |
| 2009/0086293 | A1 | 4/2009 | Sakakibara | |
| 2009/0154831 | A1* | 6/2009 | Lee et al. | 382/269 |
| 2009/0179999 | A1* | 7/2009 | Albu et al. | 348/222.1 |
| 2009/0185277 | A1* | 7/2009 | Koizumi et al. | 359/619 |

FOREIGN PATENT DOCUMENTS

JP 2008229862 A 2/2008

OTHER PUBLICATIONS

Chang et al., "Example-Based Color Transformation for Image and Video," Department of Computer Science and Engineering, Tokyo Institute of Technology, Japan, 2005 by the Association for Computing Machinery, Inc.

* cited by examiner

*Primary Examiner* — Akwasi M Sarpong
(74) *Attorney, Agent, or Firm* — Duft Bornsen & Fetting LLP

(57) ABSTRACT

Systems and associated methods provide for converting an RGB color image to a grayscale image via a lookup table of correction values. The lookup table is generated and used to compensate for errors in converting the color image to the grayscale image. The lookup table is generated by generating a reference image having pixels with color values in the RGB color space, converting a first copy of the reference image to a grayscale reference image via interpolation, and converting a second copy of the reference image to an intermediate image. The intermediate image comprises chrominance and luminance values (e.g., YCbCR or YCgCo). The chrominance values are removed from the intermediate image. The intermediate image is then compared to the grayscale reference image to generate the correction values. The lookup table may then be applied to a grayscale image that has been converted from the RGB color image.

15 Claims, 5 Drawing Sheets

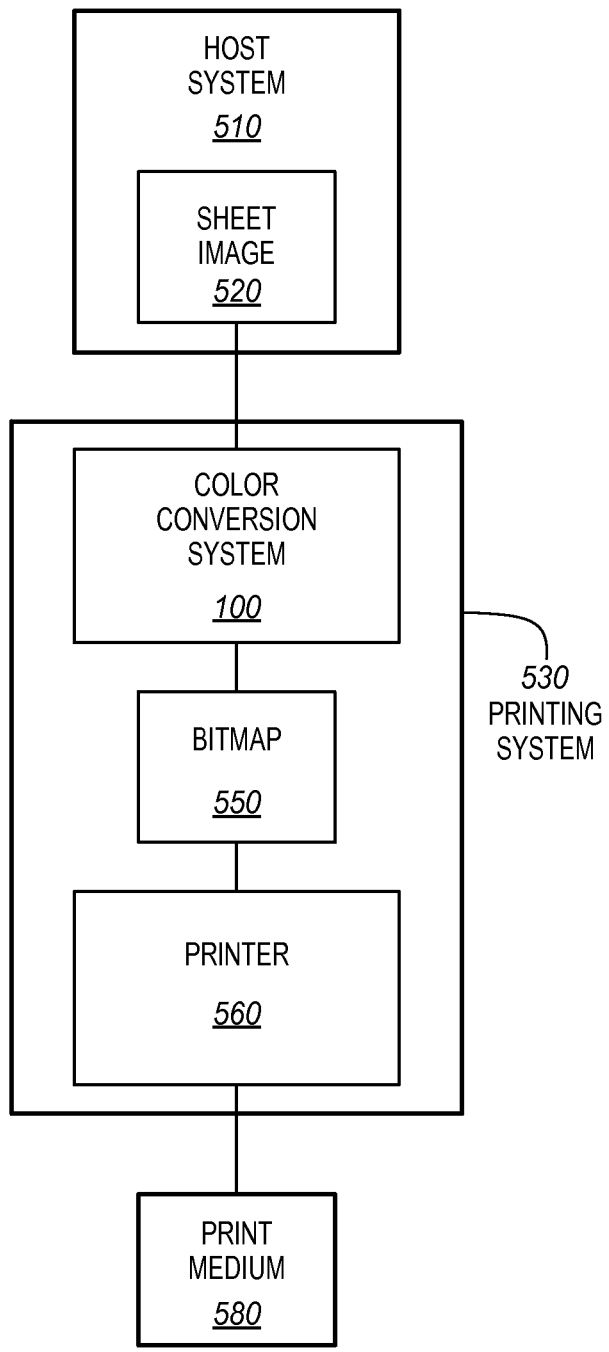

RED-GREEN-BLUE TO MONOCHROME COLOR CONVERSION

BACKGROUND

1. Field of the Invention

The invention relates to the field of color conversion and, in particular, to converting a color image to a grayscale image.

2. Statement of the Problem

In image processing, a grayscale image is an image in which the value of each pixel carries only intensity information. Images of this sort, also known as black-and-white, are composed exclusively of shades of gray, varying from black at the weakest intensity to white at the strongest. Grayscale images are distinct from one-bit black-and-white images (i.e., images with only two colors, black and white, also called bilevel or binary images). Instead, grayscale images have many shades of gray in between. Grayscale images are also called monochromatic, denoting the absence of any chromatic variation. Grayscale images are often the result of measuring the intensity of light at each pixel in a color image and representing that intensity as a varying shade of gray (e.g., 1-255 different shades of gray). Alternatively, grayscale images may be encoded so that the weakest intensity is white, while the strongest intensity is black. Grayscale encoded in this way is often called K. Some popular image formats, such as TIFF, support both encodings.

Grayscale image processing occurs in a variety of imaging devices, ranging from digital cameras to printing systems. For example, in a production printing system, the print controller within the printing system interprets image data of a print job to generate sheetside bitmaps of the print job. The sheetside bitmaps represent the image to be printed on one side of a sheet of a print medium. Each sheetside bitmap generally comprises a 2-dimensional array of picture elements ("pixels", or PELs) that represent a corresponding formatted sheet of the print job. Each pixel of the image data represents an encoded color value in accordance with the requirements of the particular print job encoding and the capabilities of the printing system on which the print job is to be printed. If the printer is a monochrome printer and/or if the print job requires monochrome printing, the print controller may first convert the color image data to grayscale. However, this grayscale color conversion generally involves interpolation of color values to grayscale values which is exceptionally processor intensive. For example, to obtain a very accurate grayscale value for printing Red Green Blue (RGB) images on a monochrome printer, a relatively large RGB to "K" lookup table (i.e., an output International Color Consortium profile, or ICC profile) is used. However, this lookup table generally requires mathematical interpolations in a three-dimensional space.

Generally, with production printing systems associated with data processing enterprises, the print controller controls the overall operation of the printing system. For example, the print controller may perform host interfacing, interpretation or rendering, and lower level process control or interface features of print engines of the printing system. In this regard, the print controller may include appropriate adapters for coupling the printing system to one or more host systems that transmit print jobs to the printing system that are generally encoded in the form of a page description language such as PostScript (PS), PCL, IPDS, etc. The print controller stores or buffers the sheetside bitmaps in accordance with storage capabilities of the particular architecture of a particular print controller. The print controller then forwards the sheetside bitmaps to one or more print engines (sometimes also referred to as an "imaging engine" or as a "marking engine"). The print engines have internal queues for storing the sheetside bitmaps to be printed. A print engine pulls the sheetside bitmaps off of the queue and performs an imaging process to mark the print medium with the sheetside bitmaps provided by the print controller. The print engine may comprise a laser print engine, an ink-jet print engine, or another type of imaging system that transfers each sheetside bitmap to corresponding pixels on paper. The print jobs received by production printing systems, however, are typically large (e.g., paper bills generated by a phone company). Thus, the print controller may be required to interpolate many color images that overwhelm the processing capabilities of the print controller and slow down printing.

The standard approach to overcome such interpolation is to convert RGB to an intermediate color space, such as YCbCr or YCgCo, discard the chrominance components (i.e., CbCr or CgCo), and use the "Y" luminance components as the grayscale value. One problem with this technique is that the separation between luminance and chrominance is not ideal as some of the luminance "bleeds" into the chrominance components. So, in discarding the chrominance components, information is lost and the grayscale value is inaccurate.

Based upon the foregoing, those skilled in the art will readily recognize that there exists a need to provide accurate grayscale conversions that do not excessively consume valuable processing resources.

SUMMARY

Embodiments herein provide relatively accurate RGB to grayscale conversions via a lookup table of correction values. In one embodiment, a method provides for generating the lookup table of correction values used to compensate for errors in the conversion of an RGB color image to a grayscale image. The method includes generating a reference image having pixels with color values in an RGB color space, converting a first copy of the reference image to a grayscale reference image via interpolation, and converting a second copy of the reference image to an intermediate image. The intermediate image comprises pixels in an intermediate color space with chrominance and luminance values. The method also includes removing the chrominance values from the intermediate image, comparing the intermediate image to the grayscale reference image to generate the correction values, and populating the lookup table with the correction values. Once the lookup table of correction values is generated, they may be applied to a grayscale image that was converted from an RGB color image. For example, the RGB color image may be converted to the intermediate color space, such as the YCbCr color space or the YCgCo color space. Thereafter, the chrominance values (CbCr or CgCo) of the converted image may be removed to generate the grayscale image. Once converted, the lookup table may be applied to the grayscale image to refine the grayscale image (e.g., reduce errors introduced by the removal of chrominance values).

During the generation of the lookup table, the interpolation process is generally performed a single time. The lookup table is then stored and used for virtually any number of RGB to grayscale color conversions. The method may be operable with a variety of devices, such as digital cameras, printers, computer processors, and the like. Additionally, some popular datastreams, such as JPEG or JPEG XR, carry RGB data already converted into an intermediate space, such as YCbCr or YCgCo. This method can then be applied to the data directly, without the initial conversion to the intermediate space.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

FIG. 5 is a block diagram illustrating a printing system in an exemplary embodiment.

DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention and are to be construed as being without limitation to such specifically recited examples and conditions. As a result, the invention is not limited to the specific embodiments or examples described below, but by the claims and their equivalents.

Figure 1:
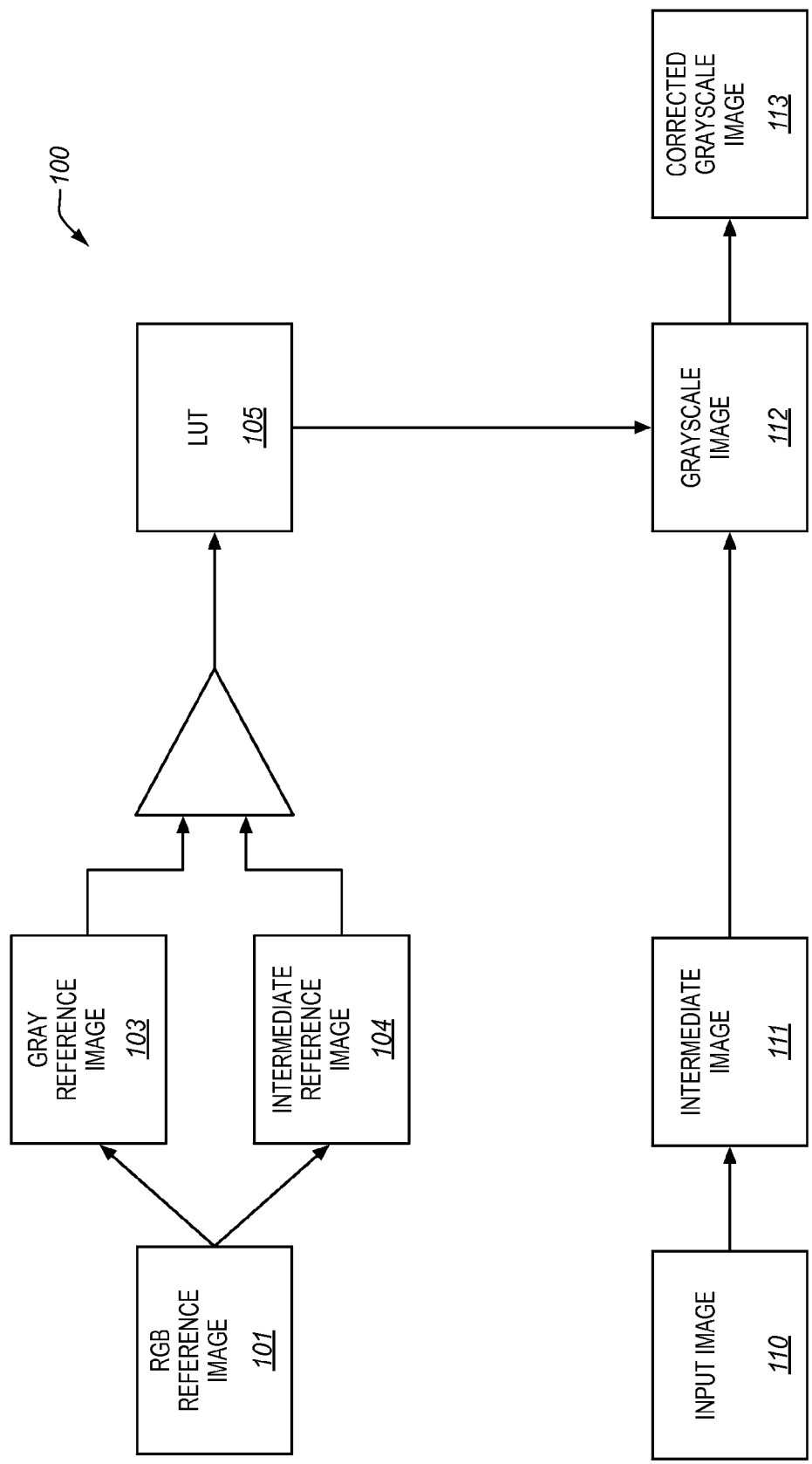
FIG. 1 illustrates a block diagram of a color conversion system in an exemplary embodiment.

FIG. 1 illustrates a block diagram of an RGB to grayscale color conversion system 100 in an exemplary embodiment. The color conversion system 100 may be implemented in a variety of devices to perform an RGB to grayscale color conversion of an input image 110. For example, the color conversion system 100 may be implemented with a printing system for monochromatic printing.

Figure 2:
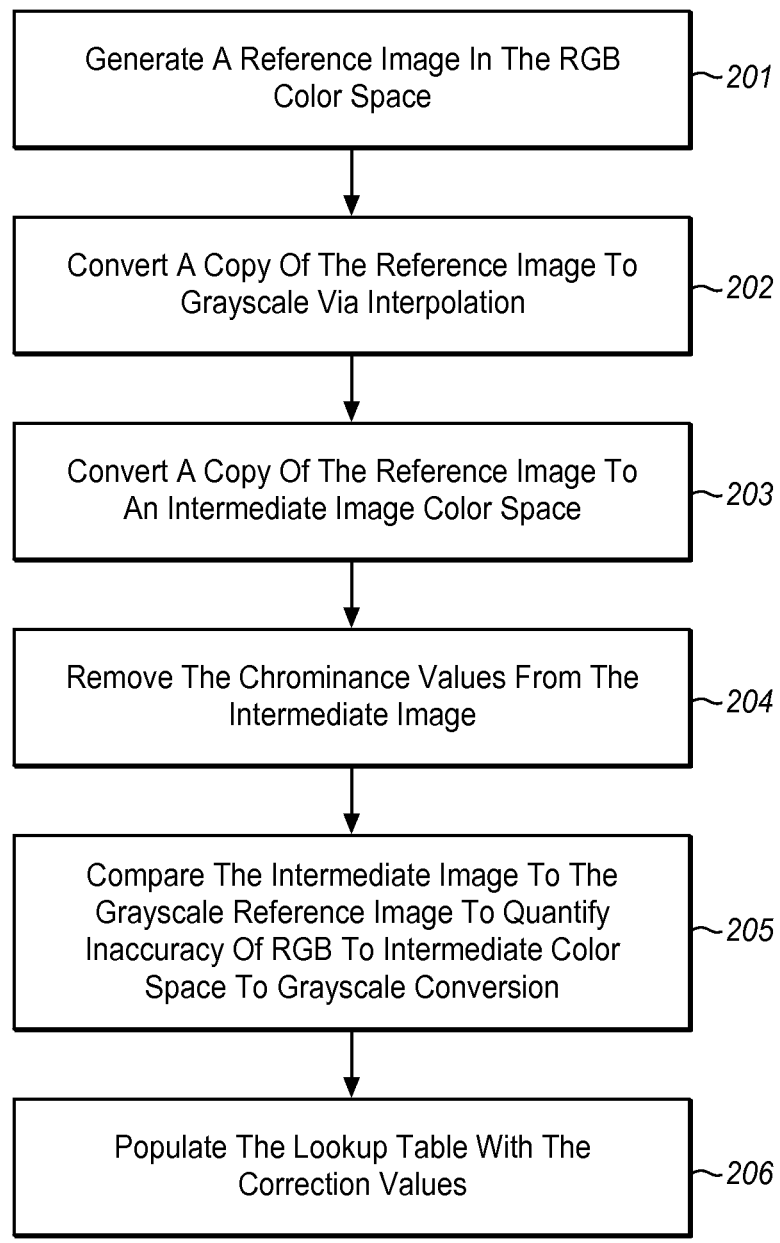
FIG. 2 is a flow chart illustrating a method of generating a lookup table of correction values for use in an RGB to grayscale color conversion in an exemplary embodiment.

FIG. 2 is a flow chart 200 illustrating a method of generating a lookup table 105 used in converting RGB color images to grayscale images in an exemplary embodiment. To generate the lookup table 105, the color conversion system 100 generates a "patch" image or reference image 101 in the RGB color space, in the process element 201. In one embodiment, the reference image is a 256×256×256 reference image in the RGB color space. The color conversion system 100 then uses the RGB reference image 101 to generate a gray reference image 103 via interpolation (e.g., using an output ICC profile), in the process element 202. The pixel values of this reference image represent the "ideal" output grayscale values for a particular output device of interest. The color conversion system 100 also converts a copy of the original RGB reference image 101 to an intermediate color space, in the process element 203 to generate an intermediate reference image 104. For example, the color conversion system 100 may convert the copy of the RGB reference image 101 to the YCbCr or YCgCo color spaces and discard the chrominance components to generate grayscale values, in the process element 204. For each Y, Cb/Cg, Cr/Co value in the RGB reference image 101, the color conversion system 100 may measure the difference between the generated grayscale values of the intermediate reference image 104 and the ideal values of the gray reference image 103, in the process element 205. The result may include a 256*256*256 difference that quantifies the inaccuracy incurred by discarding chrominance components that would be incurred during a typical RGB to intermediate color space to grayscale color conversion. The conversion system 100 generates the lookup table 105 and populates that table with correction values for application to Y values during the typical RGB to intermediate color space to grayscale color conversion, in the process element 206. In one embodiment, the color conversion system 100 generates a 33×33×33 node lookup table such that 8×8×8 YCbCr values may populate each location in the lookup table 105. For each location in the lookup table 105, the color conversion system 100 may store a grayscale value that is the average "difference" measured for all of the 512 YCbCr values that fall in that location of the lookup table 105.

Figure 3:
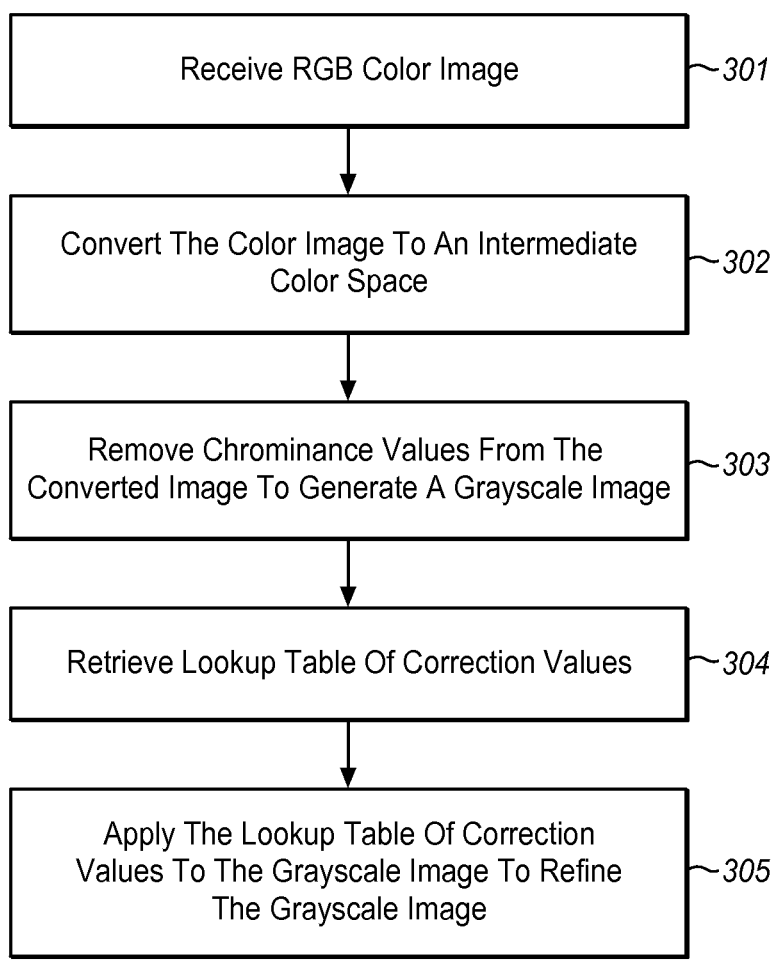
FIG. 3 is a flow chart illustrating a method of converting an image in an RGB color space to grayscale in an exemplary embodiment.

With the lookup table 105 generated, the color conversion system 100 may use the lookup table each time an input image 110 is received. Although the lookup table 105 may be used virtually any number of times during an RGB to intermediate color space to grayscale color conversion, the computationally intensive process of RGB to grayscale interpolation is performed a single time to generate the lookup table 105. FIG. 3 shows a flow chart illustrating a method 300 of converting the input image 110 in an RGB color space to grayscale using the generated lookup table 105 in an exemplary embodiment.

In the method 300, the color conversion system 100 receives the input image 110, in the process element 301, and converts a copy of the image 110 to an intermediate color space to generate an intermediate image 111, in the process element 302. For example, color conversion system 100 may convert the input image 110 to a YCbCr or a YCgCo color space as is typically done. Then, the color conversion system 100 may remove the chrominance values from the intermediate image 111, in the process element 303, to generate a grayscale image 112. For example, the CbCr components or the CgCo components may be removed from the pixels of the intermediate image 111 leaving behind the Y components of luminance. Thereafter, the color conversion system 100 may retrieve the lookup table 105 and apply the lookup table 105 to the grayscale image 112, in the process element 305, to refine the grayscale image. For example, the color conversion system 100 may subtract the correction values of the lookup table 105 from corresponding pixel values of the grayscale image 112 to correct errors introduced during the RGB to intermediate color space to grayscale color conversion. In doing so, the color conversion system 100 may retrieve a correction value in the lookup table 105 and subtract it from a Y value of the grayscale image 112 to shift the Y value toward an ideal grayscale. Thereafter, the color conversion system 100 may output the refined grayscale image 112 to an output device for display (e.g., a monochromatic printer).

Figure 4:
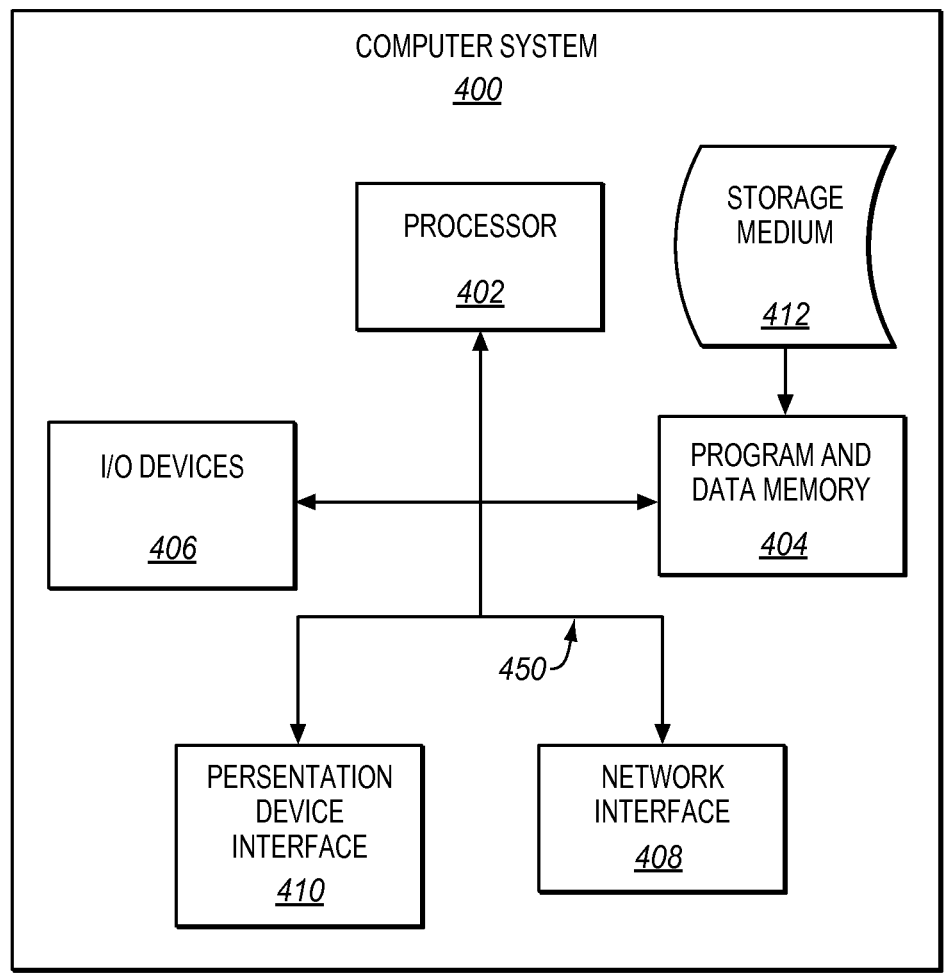
FIG. 4 illustrates a computer system operable to execute computer readable medium embodying programmed instructions to perform desired functions in an exemplary embodiment.

Embodiments of the invention can take the form of an entirely hardware embodiment, an entirely software embodiment, or an embodiment containing both hardware and software elements. In one embodiment, the invention is implemented in software, which includes but is not limited to firmware, resident software, microcode, etc. FIG. 4 is a block diagram depicting a computer system 400 operable to provide features and aspects hereof by executing programmed instructions and accessing data stored on a computer readable storage medium 412.

Furthermore, embodiments of the invention can take the form of a computer program product accessible from a computer-usable or computer-readable medium 412 providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), and DVD.

A computer system 400 suitable for storing and/or executing program code will include at least one processor 402 coupled directly or indirectly to memory elements 404 through a system bus 450. The memory elements 404 can include local memory employed during actual execution of the program code, bulk storage, and cache memories which provide temporary storage of at least some program code and/or data in order to reduce the number of times code and/or data must be retrieved from bulk storage during execution.

Input/output or I/O devices 406 (including but not limited to keyboards, displays, pointing devices, etc) can be coupled to the system either directly or through intervening I/O controllers. Network adapter interfaces 408 may also be coupled to the system to enable the computer system 400 to become coupled to other data processing systems or storage devices through intervening private or public networks. Modems, cable modems, IBM Channel attachments, SCSI, Fibre Channel, and Ethernet cards are just a few of the currently available types of network or host interface adapters. Presentation device interface 410 may be coupled to the system to interface to one or more presentation devices, such as printing systems and displays for presentation of presentation data generated by processor 402.

FIG. 5 is a block diagram illustrating a printing system 530 in an exemplary embodiment. A host system 510 is in communication with the printing system 530 to print a sheet image 520 onto a print medium 580 via a printer 560. The resulting print medium 580 may be printed in any of a number of gray shades. The host system 510 may comprise any computing device, such as a personal computer or a server. The sheet image 520 may be any file or data that describes how an image on a sheet of print medium should be printed. For example, the sheet image 520 may include PostScript data, Printer Command Language ("PCL") data, and/or any other printer language data. The printing system 530 may be a high-speed printer operable to print relatively high volumes (e.g., greater than 100 pages per minute). The print medium 580 may be continuous form paper, cut sheet paper, and/or any other medium suitable for printing. The printing system 530, in one generalized form, includes the printer 560 that presents a bitmap 550 onto the print medium 580 (e.g., via toner, ink, etc.) based on the sheet image 520.

The color conversion system 100 may be any system, device, software, circuitry and/or other suitable component operable to transform the sheet image 520 and generate a bitmap 550 in accordance with printing a monochromatic image onto the print medium 580. For example, the color conversion system 100 may process an RGB color image of the sheet image 520 in order to transform the sheet image 520 to the bitmap 550 in a monochrome or grayscale color space of the printing system 530 in accordance with the RGB to grayscale color conversion processes described herein. The color conversion system 100 may be configured as part of a print controller of the printing system 530 and/or any other portion of the printing system 530. In another embodiment, the color conversion system 100 may be configured as part of the host system 510.

Although specific embodiments are described herein, the scope of the invention is not limited to the specific embodiments. For example, the color conversion algorithms are generally described herein with respect to printing systems. However, the color conversion algorithms may be employed in virtually any device which is used to output digital images. Examples of such include computer monitors, digital cameras, and televisions. To illustrate, a color image may be captured using a digital camera. A user may desire to display a monochromatic version of the image on a computer monitor. Such can be generally accomplished via the color conversion algorithms presented herein. Accordingly, the scope of the invention is defined by the following claims and any equivalents thereof.

We claim:

1. A method of generating a lookup table of correction values used to compensate for errors in converting a color image to a grayscale image, the method comprising:
generating a reference image having pixels with color values in an RGB color space;
converting a first copy of the reference image to a grayscale reference image via interpolation;
converting a second copy of the reference image to an intermediate image, wherein the intermediate image comprises pixels in an intermediate color space with chrominance and luminance values;
removing the chrominance values from the intermediate image;
comparing the intermediate image to the grayscale reference image to generate the correction values; and
populating the lookup table with the correction values,
wherein comparing the intermediate image to the grayscale reference image to generate the correction values comprises subtracting the intermediate image from the grayscale reference image to determine differences between pixels of the images.

2. The method of claim 1, wherein the intermediate color space is a YCbCr color space.

3. The method of claim 1, wherein the intermediate color space is a YCgCo color space.

4. The method of claim 1 further comprising: storing the lookup table of correction values in a computer memory for application to a grayscale converted image.

5. The method of claim 4, wherein the application of the lookup table of correction values to the grayscale converted image comprises subtracting the correction values from luminance values of the grayscale converted image.

6. A color conversion system, comprising:
a storage module operable to store a lookup table of correction values, wherein the lookup table is generated via
a generation of a reference image having pixels with color values in an RGB color space,
a conversion of a first copy of the reference image to a grayscale reference image via interpolation, and a conversion of a second copy of the reference image to an intermediate image, wherein the intermediate image comprises pixels in an intermediate color space with chrominance and luminance values, wherein the lookup table is further generated via a removal of the chrominance values from the intermediate image, a comparison of the intermediate image to the grayscale reference image to generate the correction values, and a population of the lookup table with the correction values; and a processor operable to convert an RGB color image to a grayscale image, wherein the processor, in converting the RGB color image to a grayscale image, is operable to convert the RGB color image to the intermediate color space, remove chrominance values from the converted image to generate the grayscale image, and apply the lookup table of correction values to the grayscale image to refine the grayscale image, wherein the comparison of the intermediate image to the grayscale reference image comprises subtracting the intermediate image from the grayscale reference image to determine differences between pixels of the images.

7. The color conversion system of claim 6, wherein the intermediate color space is a YCbCr color space.

8. The color conversion system of claim 6, wherein the intermediate color space is a YCgCo color space.

9. The color conversion system of claim 6, wherein the processor is further operable to subtract the correction values from luminance values of the grayscale image to refine the grayscale image.

10. A software program embodied on a non-transitory computer readable medium comprising instruction that, when executed on a processor, are operable to direct the processor to convert an RGB color image to a grayscale image, the instructions operable to:

convert the RGB color image to an intermediate color space; remove chrominance values from the converted image to generate a grayscale image;

and retrieve and apply a lookup table of correction values to the grayscale image to refine the grayscale image, wherein the lookup table of correction values is generated via a generation of a reference image having pixels with color values in an RGB color space, a conversion of a first copy of the reference image to a grayscale reference image via interpolation, and a conversion of a second copy of the reference image to an intermediate image, wherein the intermediate image comprises pixels in the intermediate color space with chrominance and luminance values, wherein the lookup table is further generated via a removal of the chrominance values from the intermediate image, a comparison of the intermediate image to the grayscale reference image to generate the correction values, and a population of the lookup table with the correction values;

wherein the comparison of the intermediate image to the grayscale reference image comprises subtracting the intermediate image from the grayscale reference image to determine differences between pixels of the images.

11. The software program of claim 10, wherein the intermediate color space is a YCbCr color space.

12. The software program of claim 10, wherein the intermediate color space is a YCgCo color space.

13. The Software program of claim 10, wherein the Lookup table is further generated via a subtraction of the intermediate image from the grayscale reference image to determine difference between each pixel of the images and generate the correction values.

14. The software program of claim 10, wherein the instruction are further operable to direct the processor to subtract the correction values from luminance values of the grayscale image.

15. A printing system, comprising:

a printer operable to print a grayscale image to a print medium; and a print controller operable to receive an RGB color image and prepare the RGB color image for monochromatic printing via the printer, the print controller comprising:

a color conversion system operable to store a lookup table of correction values, wherein the lookup table is generated via a generation of a reference image having pixels with color values in an RGB color space, a conversion of a first copy of the reference image to a grayscale reference image via interpolation, and a conversion of a second copy of the reference image to an intermediate image, wherein the intermediate image comprises pixels in an intermediate color space with chrominance and luminance values, wherein the lookup table is further generated via a removal of the chrominance values from the intermediate image, a comparison of the intermediate image to the grayscale reference image to generate the correction values, and a population of the lookup table with the correction values; and a processor operable to convert the RGB color image to a grayscale image, wherein the processor, in converting the RGB color image to the grayscale image, is operable to convert the RGB color image to the intermediate color space, remove chrominance values from the converted image to generate the grayscale image, and retrieve and apply the lookup table of correction values to the grayscale image to refine the grayscale image;

wherein the comparison of the intermediate image to the grayscale reference image comprises subtracting the intermediate image from the grayscale reference image to determine differences between pixels of the images.

* * * * *